(12) United States Patent
Xu et al.

(10) Patent No.: US 11,914,881 B2
(45) Date of Patent: Feb. 27, 2024

(54) DATA MIGRATION METHOD AND APPARATUS

(71) Applicant: Huawei Cloud Computing Technologies Co., Ltd., Gui'an New District (CN)

(72) Inventors: Feng Xu, Chengdu (CN); Yu Zhang, Chengdu (CN); Ling Lin, Chengdu (CN); Chen Ling, Shenzhen (CN); Lei Huang, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 17/144,999

(22) Filed: Jan. 8, 2021

(65) Prior Publication Data

US 2021/0132849 A1 May 6, 2021

Related U.S. Application Data

(63) Continuation of application No. PCT/CN2019/094110, filed on Jul. 1, 2019.

(30) Foreign Application Priority Data

Jul. 9, 2018 (CN) .......................... 201810748632.4

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
CPC ....... G06F 3/0647; G06F 3/0604; G06F 3/067
See application file for complete search history.

(56) References Cited

U.S. PATENT DOCUMENTS

| 8,965,847 B1 | 2/2015 | Chang |
| 2001/0000818 A1 | 5/2001 | Nagasawa et al. |

(Continued)

FOREIGN PATENT DOCUMENTS

| CN | 101105737 A | 1/2008 |
| CN | 103067433 A | 4/2013 |

(Continued)

OTHER PUBLICATIONS

Taylor et al, Architectural Styles and the Design of Network-based Software Architectures (Year: 2000).*

(Continued)

*Primary Examiner* — Craig S Goldschmidt
(74) *Attorney, Agent, or Firm* — Leydig, Voit & Mayer, Ltd.

(57) ABSTRACT

A data migration method and an apparatus are provided. The method is as follows: sending, by a first storage system, a location update request to a location server, where the location update request is used to indicate the location server to update location information of a first bucket from being located in a second storage system to being located in the first storage system; migrating data in a first bucket from the second storage system; receiving a data access request, where the data access request is used to access the data in the first bucket; and determining based on a type of the data access request and a migration status of the data, that the first storage system or the second storage system processes the data access request.

15 Claims, 8 Drawing Sheets

(56) References Cited

U.S. PATENT DOCUMENTS

| | | |
|---|---|---|
| 2002/0080691 A1 | 6/2002 | Cho |
| 2005/0283564 A1* | 12/2005 | LeCrone ............... G06F 3/0646 711/100 |
| 2006/0015697 A1 | 1/2006 | Morishita et al. |
| 2006/0107010 A1 | 5/2006 | Hirezaki et al. |
| 2007/0245110 A1* | 10/2007 | Shibayama ........... G06F 3/0647 711/165 |
| 2010/0287345 A1 | 11/2010 | Cherian et al. |
| 2011/0191389 A1 | 8/2011 | Okamoto |
| 2013/0166872 A1 | 6/2013 | Arakawa |
| 2014/0351538 A1 | 11/2014 | Kono et al. |
| 2015/0355862 A1* | 12/2015 | Hayes ................... G06F 3/0607 711/114 |
| 2016/0041995 A1* | 2/2016 | Prinz, III .............. G06F 16/119 707/694 |

FOREIGN PATENT DOCUMENTS

| | | |
|---|---|---|
| CN | 104603774 A | 5/2015 |
| CN | 104778179 A | 7/2015 |
| CN | 105549904 A | 5/2016 |
| CN | 106294387 A | 1/2017 |
| CN | 107577425 A | 1/2018 |
| CN | 107656705 A | 2/2018 |
| CN | 107704206 A | 2/2018 |
| CN | 109189324 A | 1/2019 |

OTHER PUBLICATIONS

Zhao et al., "Research on data migration method in FY-2 storage system upgrading," Meteorological, Hydrological and Marine Instruments. No. 4, Total 5 pages (Dec. 2014). With English Abstract.

* cited by examiner

DATA MIGRATION METHOD AND APPARATUS

CROSS-REFERENCE TO RELATED APPLICATIONS

This application is a continuation of International Application No. PCT/CN2019/094110, filed on Jul. 1, 2019, which claims priority to Chinese Patent Application No. 201810748632.4, filed on Jul. 9, 2018. The disclosures of the aforementioned applications are hereby incorporated by reference in their entireties.

TECHNICAL FIELD

Embodiments of this disclosure relate to the field of storage technologies, and in particular, to a data migration method and an apparatus.

BACKGROUND

As an object storage service is upgraded or replaced, from a customer's perspective, the customer wants to use a new storage system with higher performance and a more reasonable price. From a perspective of enterprise management, an enterprise wants to use the new storage system to replace an old storage system, and to bring the old storage system offline to reduce management costs for maintaining the system. Therefore, data migration between the old system and the new systems is inevitable during development of the object storage service.

Figure 1:
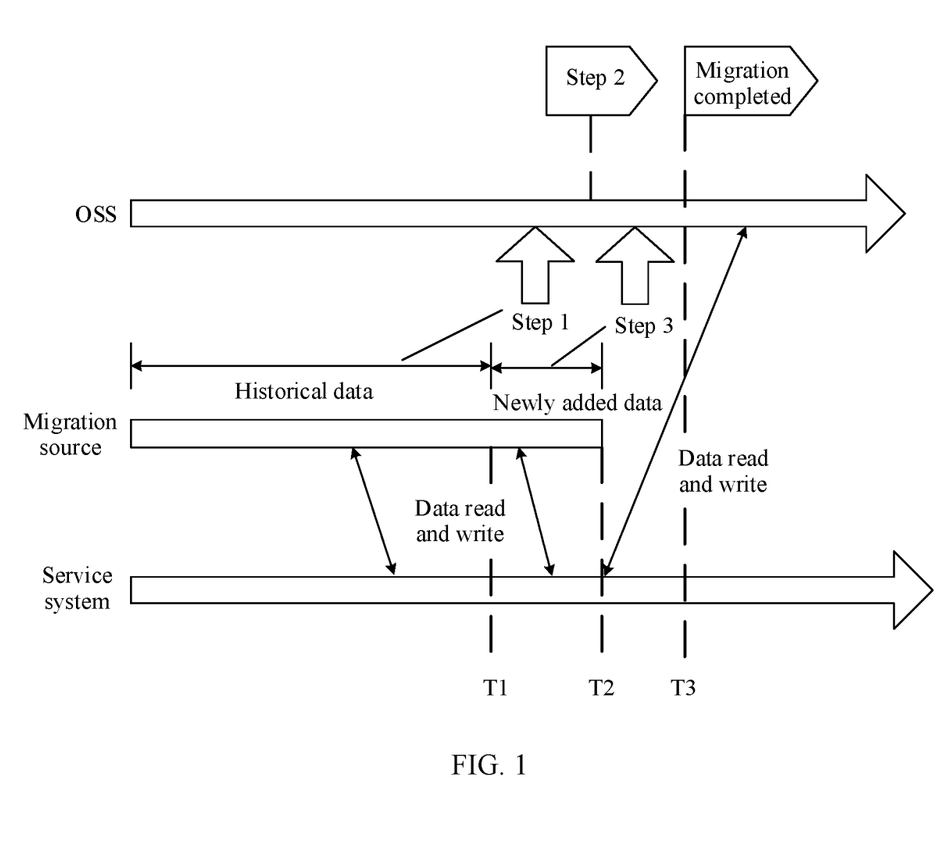
FIG. 1 is a schematic diagram of a migration solution of an OssImport+mirror retrieval.

Currently, one solution of a cross-region replication technology is used to back up a customer's newly added service across regions. A principle of the solution is as follows. A user creates a target bucket in a target region, and synchronizes inventory data or incremental data in a source bucket to the target bucket through configuration. This cross-region replication technology is a replication technology between buckets. Two buckets are required to be distributed in different regions, and this incurs extra storage costs. For the customer, data synchronization between the two buckets is a data replication technology instead of data migration. The customer can access data in the target bucket after data replication is completed, and the customer needs to determine whether to access the source bucket or the target bucket. Another solution is migrating third-party data. This solution includes two technologies: importing the inventory data and retrieving the incremental data. The two technologies need to be used in combination to complete the migration. For example, in a migration solution of OssImport+mirror retrieval, as shown in FIG. 1, in a step 1, historical data before T1 first needs to be fully migrated. in a step 2, open an object storage service (OSS) system to perform a mirror retrieval, and switch read and write to the OSS, and no data is newly added to a migration source. In a step 3, quickly migrate newly added data between T1 and T2. In this solution, the operation steps are relatively complex and demanding, and can be only implemented with high skill requirements. For the customer, the data migration is also between the two buckets. The customer needs to modify an application programming interface (API) to access the target bucket, and this incurs the extra storage costs. In addition, the customer needs to manually ensure that attributes of the migrated buckets are consistent. When the historical data is migrated, the newly added data is still uploaded to the source bucket, and another migration is required for the newly added data. Therefore, there is no corresponding technology in the industry to migrate data without affecting a customer's normal service.

SUMMARY

This disclosure provides a data migration method and an apparatus, to resolve a problem that a customer's normal service is affected during data migration.

According to a first aspect, a data migration method is provided, including: sending, by a first storage system, a location update request to a location server, where the location update request is used to indicate the location server to update location information of a first bucket from being located in a second storage system to being located in the first storage system; migrating data in the first bucket from the second storage system, and storing the data in a second bucket in the first storage system, where an identifier of the second bucket is the same as an identifier of the first bucket; receiving a data access request, where the data access request is used to access the data in the first bucket; and determining, by the first storage system based on a type of the data access request and a migration status of the data, that the first storage system or the second storage system processes the data access request. In this way, because the identifier of the bucket in the migrated second storage system is the same as the identifier of the bucket in the first storage system, and the location information of the migrated bucket is updated in the location server, the data access request is directed to the first storage system for processing. If the first storage system may process the request based on the migrated data, the first storage system directly processes the request. If the data accessed by the data access request has not been migrated to the first storage system, the first storage system may obtain the data from the second storage system and feed back the data to a customer. For the customer, the identifier of the bucket remains unchanged, and an API remains unchanged. In a migration process, a customer's service is not damaged, the customer is unaware of a data migration, and customer's storage costs are not increased. Therefore, a problem that the customer's service is affected during data migration can be resolved.

In a possible design, the migrating, by the first storage system, data in the first bucket from the second storage system includes: first migrating, by the first storage system, metadata of an object in the first bucket, and then migrating remaining data other than the metadata in the first bucket. In this way, because the metadata of the object in the bucket is irrelevant to a size of the object, and is basically of a fixed size, a migration speed of the metadata of the object is fast. After the metadata of the object is migrated, some data access requests may be directly processed in the second bucket in the first storage system, and the data access requests do not need to be forwarded to the second storage system. For example, the data access request is used to list objects in the bucket, calculate a quantity of objects, manage life cycles of the objects, or the like.

In a possible design, the receiving, by a first storage system, a data access request includes: receiving, by the first storage system from the second storage system, the data access request, or receiving, by the first storage system, the data access request sent by a virtual host, where the data access request includes the identifier of the first bucket. If the first storage system receives the data access request from the second storage system, it may be understood that a client first sends the data access request to the migrated second storage system in a fixed IP access manner, and the data access request sent to the second storage system carries an IP address of the second storage system and the identifier of the first bucket. The second storage system learns, from the location server, that the location information of the first bucket points to the first storage system, and then the second storage system sends the data access request to the first storage system. If the customer sends the data access request by using the virtual host, the data access request is directly sent to the first storage system. In this way, regardless of an access manner in the two manners, the data access request is first sent to the first storage system for processing, so that the first storage system may directly process or store the uploaded data locally based on the migrated data.

In a possible design, the determining, by the first storage system based on a type of the data access request and a migration status of the data, that the first storage system or the second storage system processes the data access request includes: when the type of the data access request is a download request, determining, by the first storage system, whether data requested by the download request has been migrated to the second bucket; when the data requested by the download request has been migrated to the second bucket, obtaining, by the first storage system from the second bucket, the data requested by the download request; when the data requested by the download request has not been migrated to the second bucket, and the data requested by the download request is not the metadata, obtaining, by the first storage system from the first bucket, the data requested by the download request, and sending the data to the client; and when the data requested by the download request has not been migrated to the second bucket, and the data requested by the download request is the metadata, migrating, by the first storage system, the metadata from the first bucket to the second bucket for storage, and sending the metadata to the client. In this way, in the data migration process, the migrated second storage system and the first storage system are online at the same time to provide services externally, and the data access request during this period is first sent to the first storage system for processing. For the customer, the identifier of the bucket and the API remain unchanged, the customer is unaware of the data migration, and the customer's storage costs are not increased.

In a possible design, the determining, by the first storage system based on a type of the data access request and a migration status of the data, that the first storage system or the second storage system processes the data access request includes: when the type of the data access request is an upload request, storing, by the first storage system, data uploaded by the upload request in the second bucket.

According to a second aspect, a storage system is provided, where the storage system serves as a first storage system, including: a communications module, configured to send a location update request to a location server, where the location update request is used to indicate the location server to update location information of a first bucket from being located in a second storage system to being located in the first storage system; the communications module, further configured to: migrate data in the first bucket from the second storage system, and store the data in a second bucket in the first storage system, where an identifier of the second bucket is the same as an identifier of the first bucket; the communications module, further configured to receive a data access request, where the data access request is used to access the data in the first bucket; and a processing module, configured to determine, based on a type of the data access request and a migration status of the data, that the first storage system or the second storage system processes the data access request.

In a possible design, the communications module is configured to: first migrate metadata of an object in the first bucket, and then migrate remaining data other than the metadata in the first bucket.

In a possible design, the communications module is configured to: receive, from the second storage system, the data access request, or receive, from the first storage system, the data access request sent by a virtual host, where the data access request includes the identifier of the first bucket.

In a possible design, the processing module is configured to: when the type of the data access request is a download request, determine whether data requested by the download request has been migrated to the second bucket; when the data requested by the download request has been migrated to the second bucket, obtain, from the second bucket, the data requested by the download request; when the data requested by the download request has not been migrated to the second bucket, and the data requested by the download request is not the metadata, obtain, from the first bucket, the data requested by the download request, and send the data to a client; and when the data requested by the download request has not been migrated to the second bucket, and the data requested by the download request is the metadata, migrate the metadata from the first bucket to the second bucket for storage, and send the metadata to the client.

In a possible design, the processing module is configured to: when the type of the data access request is an upload request, store, in the second bucket, data uploaded by the upload request.

According to still another aspect, an embodiment of this disclosure provides a computer storage medium that is configured to store a computer software instruction used by the foregoing first storage system, and the computer software instruction includes a program designed for performing the foregoing first aspect.

According to still another aspect, an embodiment of this disclosure provides a computer program product including an instruction. When the computer program product runs on a computer, the computer is enabled to perform the method in the foregoing first aspect.

Embodiments of this disclosure provide the data migration method and the apparatus that may be applied to the first storage system. The first storage system sends the location update request to the location server, where the location update request is used to indicate the location server to update the location information of the first bucket from being located in the second storage system to being located in the first storage system; migrates the data in the first bucket from the second storage system, and stores the data in the second bucket in the first storage system, where the identifier of the second bucket is the same as the identifier of the first bucket; and receives the data access request, where the data access request is used to access data in the first bucket. The first storage system determines, based on the type of the data access request and the migration status of the data, that the first storage system or the second storage system processes the data access request. In this way, because the identifier of the bucket in the migrated second storage system is the same as the identifier of the bucket in the first storage system, and the location information of the migrated bucket is updated in the location server, the data access request is directed to the first storage system for processing. If the first storage system may process the request based on the migrated data, the first storage system directly processes the request. If the data accessed by the data access request has not been migrated to the first storage system, the first storage system may obtain the data from the second storage system and feed back the data to a customer. For the customer, the identifier of the bucket remains unchanged, and the API remains unchanged. In the migration process, the customer's service is not damaged, the customer is unaware of the data migration, and the customer's storage costs are not increased. Therefore, the problem that the customer's service is affected during data migration can be resolved.

DESCRIPTION OF EMBODIMENTS

A data migration method provided in the embodiments of this disclosure may be applied to a scenario in which intra-bucket data of a same cloud service provider is migrated between different locations or systems. Before and after the migration, a client does not need to be changed. After the migration starts, the intra-bucket data may be immediately accessed in a new location or a new storage system, and newly added data is also directly stored in the new location or the new storage system.

Figure 2:
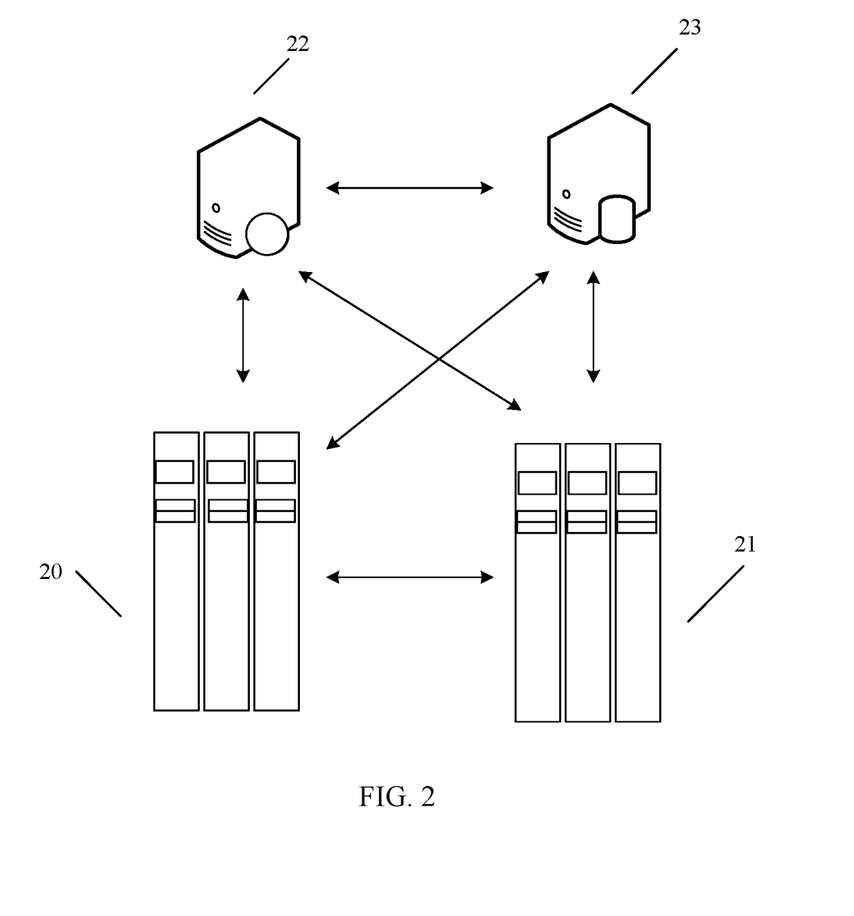
FIG. 2 is a schematic diagram of a network architecture according to an embodiment of this disclosure.

As shown in FIG. 2, a network architecture of this disclosure may include a first storage system 20, a second storage system 21, a domain name system (DNS) 22, and a location server 23. The first storage system is a storage system after a data migration, and the second storage system is a storage system before the data migration. The domain name system is used for domain name resolution, and the location server is configured to query a location in which data is stored, for example, configured to query a location of a bucket in which the data is stored is the first storage system or the second storage system.

Figure 3:
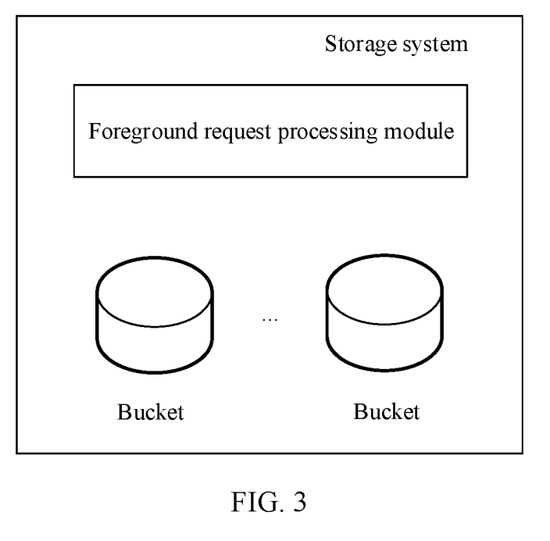
FIG. 3 is a schematic structural diagram of a first storage system according to an embodiment of this disclosure.

As shown in FIG. 3, a storage system includes a foreground request processing module and a plurality of storage regions, and each storage region may be referred to as a bucket. In a storage model, each bucket stores at least one object and metadata corresponding to each object. The storage system may be the first storage system 20 or the second storage system 21.

This disclosure is used to resolve an intra-bucket data migration problem in the field of object storage, including migrations of inventory data and newly added data. When the migrations are completed, only location information of the bucket and location information of the intra-bucket data change. For a customer, an identifier of the bucket (or a bucket name) remains unchanged, and an API remains unchanged. In a migration process, a customer's service is not damaged, the customer is unaware of a data migration, and customer's storage costs are not increased. This reduces skill requirements on the customer. The customer may specify a plurality of buckets for a concurrent migration.

A basic principle of this disclosure may be as follows. The data migration is performed based on a bucket level. When it is determined that the data migration needs to be performed, a new service of a migrated bucket is first isolated, so that the new service accesses a destination bucket. In this way, data in the migrated bucket is stable, then the data in the migrated bucket is gradually migrated to the destination bucket. After the migration is completed, the data in the migrated bucket is automatically reclaimed without extra charges. No adaptation is required before, after, and during bucket migration.

The following describes the embodiments of this disclosure.

Figure 4:
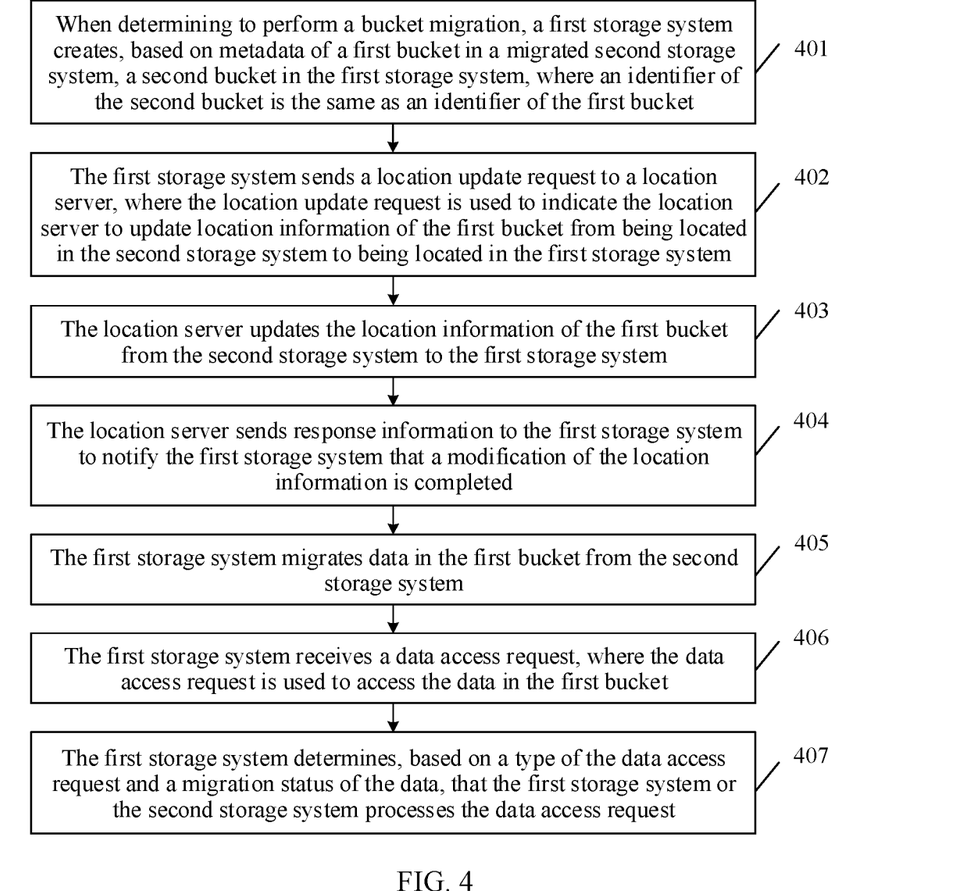
FIG. 4 is a schematic flowchart of a data migration method according to an embodiment of this disclosure.

An embodiment of this disclosure provides a data migration method. As shown in FIG. 4, the method includes the following steps.

401: When determining to perform a bucket migration, a first storage system creates, based on metadata of a first bucket in a migrated second storage system, a second bucket in the first storage system, where an identifier of the second bucket is the same as an identifier of the first bucket.

When a customer determines that the bucket migration needs to be performed, for example, the second storage system needs to go offline, and data in the second storage system needs to be migrated to the first storage system, a manual operation may be performed on the first storage system, so that the first storage system starts the bucket migration. When determining to start the bucket migration, the first storage system may first obtain metadata of a bucket in the second storage system from the second storage system, to create a corresponding new bucket in a new region of the first storage system based on the metadata of the bucket in the second storage system. The second storage system also learns that the data is to be migrated from the current system to the first storage system. There may be at least one migrated bucket in the second storage system herein, that is, a plurality of buckets may be migrated at the same time. In this disclosure, a first bucket of the at least one bucket is used as an example for description.

For example, when the migrated bucket in the second storage system includes the first bucket, and when the first storage system obtains metadata of the first bucket from the second storage system, the first storage system creates, based on the metadata of the first bucket, the second bucket in the first storage system, and the metadata of the first bucket may include a creation time of the first bucket, the identifier of the first bucket, a user, and the like. The metadata of the second bucket is the same as the metadata of the first bucket, and certainly the identifier of the second bucket is also the same as the identifier of the first bucket.

402: The first storage system sends a location update request to a location server, where the location update request is used to indicate the location server to update location information of the first bucket from being located in the second storage system to being located in the first storage system.

After the first storage system completes creating the bucket, the first storage system may indicate the location server to modify location information of the bucket in the second storage system. The location update request may include the identifier of the migrated second storage system and the identifier of the first storage system, to indicate the location server to update the location information of the bucket in the second storage system from the second storage system to the first storage system.

403: The location server updates the location information of the first bucket from the second storage system to the first storage system.

In a possible implementation, the location server may modify, in the location server based on the identifier of the migrated second storage system and the identifier of the first storage system that are in the location update request, a value of a location information field of the bucket in the second storage system from the identifier of the second storage system to the identifier of the first storage system. For example, when a location information field of the first bucket in the second storage system is indicated by bkt2, a value of the field before modification is an identifier cluster1 of the second storage system, indicating that the location information of the first bucket is the second storage system, and if the value of the field after modification is an identifier cluster2 of the first storage system, the location information of the first bucket is updated from the second storage system to the first storage system.

404: The location server sends response information to the first storage system to notify the first storage system that the modification of the location information is completed.

405: The first storage system migrates data in the first bucket from the second storage system.

After learning that the location server completes modifying the location information of the first bucket, the first storage system may begin to obtain data in the bucket in the second storage system from the second storage system. For example, the first storage system obtains the data in the first bucket from the second storage system by using a REST interface of object storage. The REST interface is used for the data migration herein, and an internal architecture and a storage model that are of a system may be transparent.

It should be noted that, a moment at which the second storage system starts to migrate the data to the first storage system may be that when the second storage system receives an instruction for the first storage system obtaining the metadata of the bucket. If the second storage system has a data access request that is being processed but has not been processed completely, the second storage system does not first start to migrate the data to the first storage system. After the second storage system completes processing the data access request that is being processed, the second storage system starts to migrate the data to the first storage system. For example, the first storage system starts to receive the data migrated from the first bucket in the second storage system, and writes the data into the second bucket that is corresponding to the first bucket and that is in the first storage system. If a conflict occurs during data merging, the first storage system uses the second bucket. After the second storage system receives the instruction for obtaining the metadata of the bucket, the received data access request is first sent to the first storage system for processing, which is specifically described in step 406 below.

When migrating the data from the second storage system, the first storage system may first migrate metadata of objects in all buckets from the second storage system, and then migrate remaining data in all buckets other than the metadata of the objects. For example, the first storage system first migrates metadata of an object in the first bucket, stores the metadata of the object in the second bucket, then migrates remaining data other than the metadata in the first bucket of the object, and stores the remaining data in the second bucket. In this way, because the metadata of the object in the bucket is irrelevant to a size of the object, the metadata of the object is basically of a fixed size, and a migration speed is fast, after the migration of the object is completed, some data access requests for accessing the metadata of the object may be directly processed in the first storage system, and the data access requests do not need to be forwarded to the second storage system. For example, the data access request is used to list the objects in the bucket, calculate a quantity of objects, or manage a lifecycle of the object.

406: The first storage system receives the data access request, where the data access request is used to access the data in the first bucket.

There are two cases for description herein. In one case, the data access request accesses the data in a fixed Internet Protocol (IP) manner. In the other case, the data access request is sent by using a virtual host.

If accessing the data in the fixed IP manner, the data access request carries an IP address of the migrated second storage system, an identifier of a to-be-accessed bucket, and an identifier of a to-be-accessed object, that is, the customer still accesses the data by using an original IP address. For the customer, a bucket name remains unchanged, an API remains unchanged, and the customer is unaware of the data migration. In this way, the data access request is first sent to the second storage system, and the second storage system requests, from the location server, to learn location information of the to-be-accessed bucket. Because the location server has updated the location information of the bucket to the first storage system, when the second storage system learns that the location information of the bucket is the first storage system and obtains an IP address of the first storage system, the second storage system sends the data access request to the first storage system based on the IP address of the first storage system. In this case, the data access request includes the IP address of the first storage system, the identifier of the to-be-accessed bucket, and the identifier of the to-be-accessed object. It should be noted herein that, if the bucket is not accessed for the first time after the location information of the bucket is updated, the second storage system may also cache updated location information of the bucket when accessing the bucket for the first time, and directly send the data access request to the first storage system when the cache does not expire, to obtain to-be-accessed data from the first storage system.

For example, a first data access request that is received by a second storage system cluster1 and that is sent by the customer is accessed in the fixed IP manner, and a uniform resource locator (URL) corresponding to the first data access request is http://8.40.229.12/bkt2/obj1. 8.40.229.12 is the fixed IP address of the second storage system, bkt2 is an identifier of a first bucket, and obj1 is an identifier of an object. When receiving the first data access request, the second storage system queries location information of the first bucket from a location server, if the location server has fields bkt1:cluster1, and bkt2:cluster2, the second storage system learns that the location information of the first bucket bkt2 points to a first storage system cluster2, and a fixed IP address 8.40.229.32 of the first storage system cluster2 is obtained. Therefore, the second storage system sends a second data access request to the first storage system, and the second data access request is the data access request in step 405, and carries the fixed IP address of the first storage system, the identifier bkt2 of the first bucket, and the identifier obj1 of the object.

If the data is accessed by using the virtual host, the data access request is sent to a DNS. A URL corresponding to the data access request carries the identifier of the to-be-accessed bucket and the identifier of the to-be-accessed object, and the DNS stores identifiers of all storage systems and corresponding IP addresses. After parsing the URL to obtain the identifier of the bucket, the DNS requests, from the location server, to obtain the location information of the bucket; after obtaining, based on the identifier of the bucket, the identifier of the first storage system corresponding to the bucket, the location server feeds back the identifier of the first storage system to the DNS; then the DNS obtains, based on the identifier of the first storage system, an IP address corresponding to the first storage system, and feeds back the IP address to the customer; and the customer sends, based on the IP address corresponding to the first storage system, the data access request to the first storage system. In this case, the data access request includes the identifier of the to-be-accessed bucket and the identifier of the to-be-accessed object.

For example, the second storage system is a migrated system, and the first storage system is a system after the data migration. If the object obj1 in the first bucket bkt2 needs to be accessed by using the virtual host, a URL corresponding to the object obj1 is http://bkt2.hwsclouds.com/obj1, and the URL is first sent to the DNS. The DNS stores the identifier cluster1 of the second storage system and the corresponding IP address 8.40.229.12 of the second storage system, and the identifier cluster2 of the first storage system and the corresponding IP address 8.40.229.32 of the first storage system. The DNS parses the URL to obtain the identifier bkt2 of the to-be-accessed first bucket, and requests, from the location server, to obtain the location information of the first bucket based on the identifier bkt2 of the first bucket. If the location information of the first bucket points to the first storage system after a location is updated, the DNS locally obtains the IP address corresponding to the identifier cluster2 of the first storage system and feeds back the IP address to the customer. The customer sends the data access request to the first storage system based on the fixed IP address 8.40.229.32 of the first storage system cluster2, and the data access request includes the identifier bkt2 of the to-be-accessed first bucket and the identifier obj1 of the object.

In this way, no adaptation is required before, after, and during bucket migration. After the migration starts, if the customer accesses the bucket in a virtual host manner, the access request is directly located to the bucket after data migration. If the customer accesses the migrated bucket by using the fixed IP, the migrated bucket also forwards the access request to the bucket after data migration.

407: The first storage system determines, based on a type of the data access request and a migration status of the data, that the first storage system or the second storage system processes the data access request.

It can be learned from step 406 that regardless of a manner in which the customer accesses the data, the data access request is finally first sent to the first storage system for processing. Because the first storage system is still in a data migration process, that is, when the data migration is not completed, the first storage system cannot process an access request for data that is not migrated, the first storage system needs the second storage system to assist in processing. In this way, in the data migration process, when processing the data access request, the first storage system needs to determine, based on the type of the data access request and the migration status of the data, whether the first storage system processes the data access request or the second storage system assists in processing the data access request.

Specifically, an example in which the customer accesses the data in the first bucket is used. When the type of the data access request is a download request, the first storage system determines whether data requested by the download request has been migrated to the second bucket in the first storage system; when the data requested by the download request has been migrated to the second bucket, the first storage system obtains, from the second bucket, the data requested by the download request; when the data requested by the download request has not been migrated to the second bucket, and the data requested by the download request is not the metadata, the first storage system obtains, from the first bucket, the data requested by the download request, sends the data to a client, and then stores the data requested by the download request in the second bucket. Specifically, if the data requested by the download request is not the metadata and has not been migrated to the second bucket, the first storage system may obtain the requested data from the second bucket in the second storage system, store the requested data in a memory of the first storage system, and feed back the requested data to the client; and then migrates the data stored in the memory to the first bucket. In this way, for the client, when requesting the data, the client obtains a comparatively short delay of a feedback. When the data requested by the download request has not been migrated to the second bucket, and the data requested by the download request is the metadata, the first storage system migrates the metadata from the first bucket, stores the metadata in the second bucket, and sends the metadata to the client; and then migrates data other than the metadata from the first bucket to the second bucket. Because the metadata of the object in the bucket is irrelevant to the size of the object, and is basically of the fixed size, and the migration speed is fast, when the client requests the metadata, the metadata may be first migrated to the second bucket before feeding the metadata back to the client.

When the type of the data access request is an upload request, the first storage system stores data uploaded by the upload request in the second bucket.

When the data in the first bucket in the second storage system has been migrated to the second bucket, all subsequently received data access requests used to access the first bucket are processed only in the first storage system, and the first bucket may go offline. When data in all buckets in the second storage system is migrated to the first storage system, the second storage system may go offline.

Figure 5:
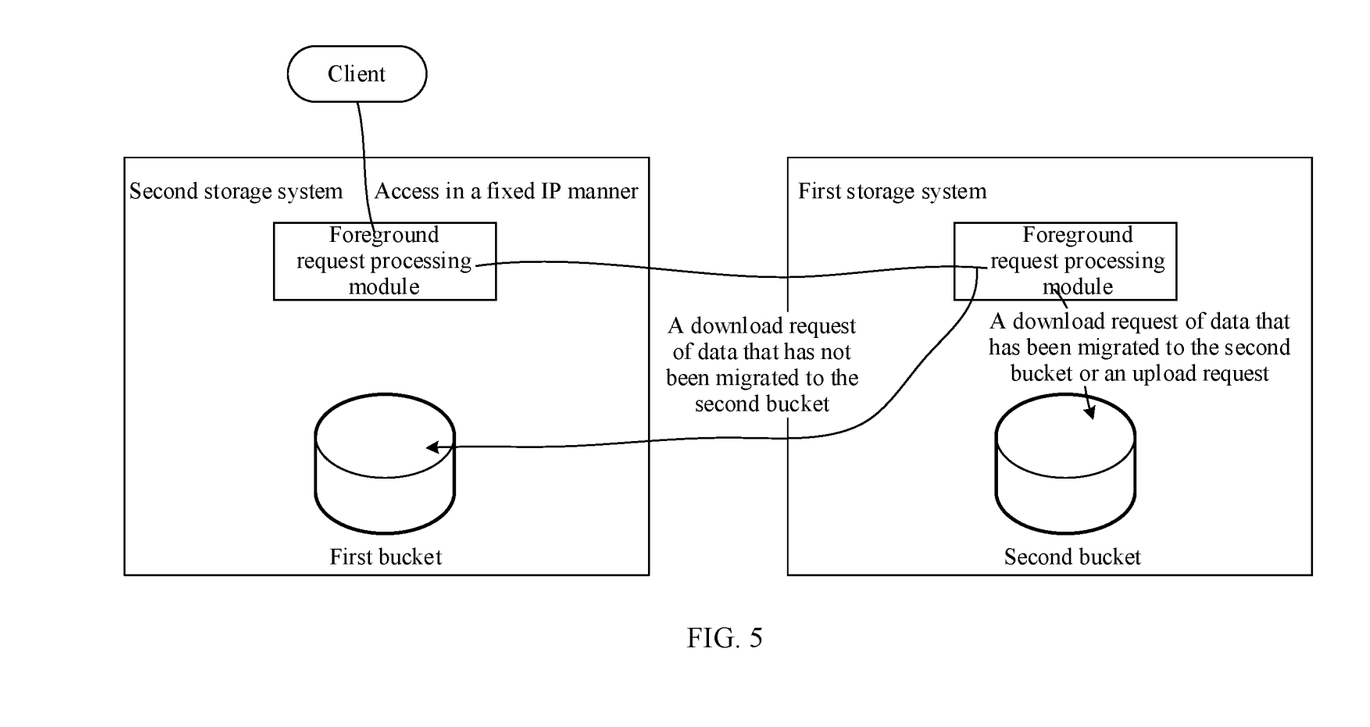
FIG. 5 is a schematic processing diagram of a data access request in a data migration process according to an embodiment of this disclosure.
Figure 6:
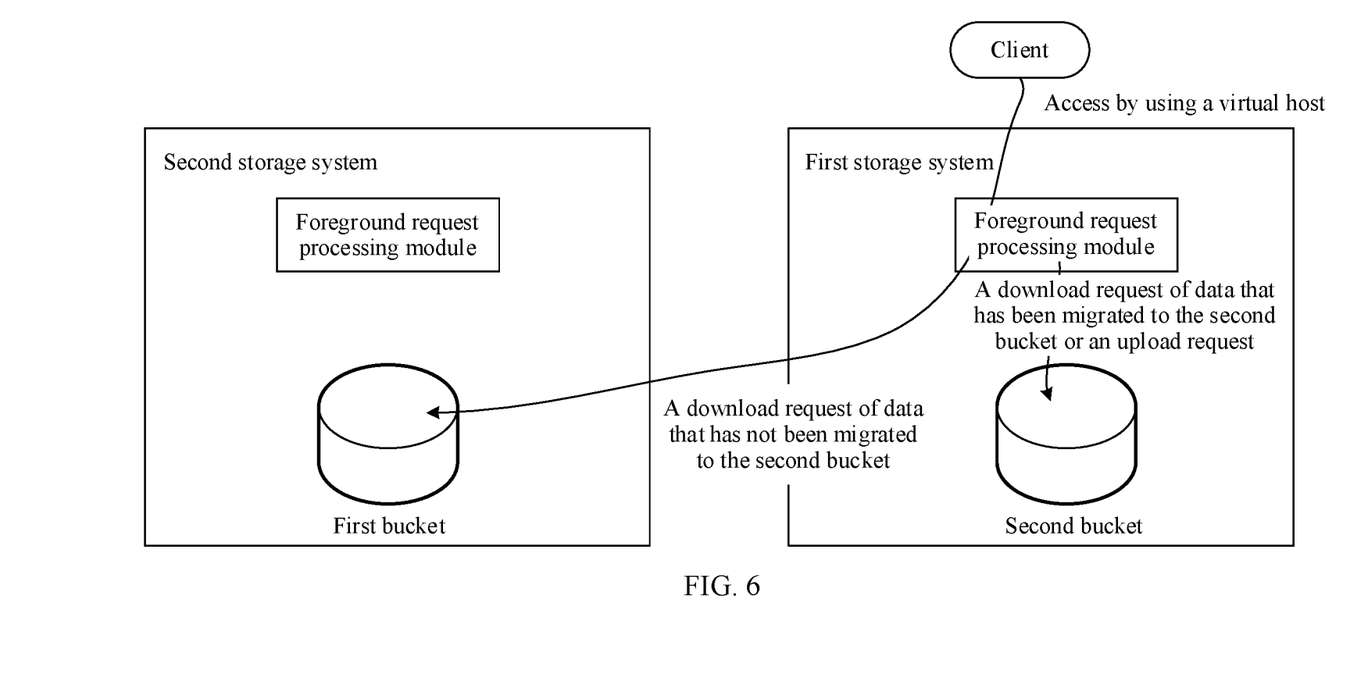
FIG. 6 is a schematic processing diagram of a data access request in a data migration process according to an embodiment of this disclosure.

With reference to different access manners in step 406 and different types of the data access request in step 407, if the client accesses the data in the fixed IP manner, transfer of the data access request between the two storage systems may be shown in FIG. 5, and if the client accesses the data by using the virtual host, transfer of the data access request between the two storage systems may be shown in FIG. 6.

As shown in FIG. 5 and FIG. 6, when a data migration is not completed, the first bucket in the second storage system and the second bucket in the first storage system are online at the same time to provide services externally. After the migration is completed, the first bucket goes offline and no longer provides the services. Therefore, in the data migration method in this disclosure, even if data is still in a migration process, a data access request is first transmitted to a new storage system for processing. If the new storage system can process the data access request, the data access request is directly processed, for example, accessing migrated data or uploading new data. If the new storage system cannot process the data, the new storage system obtains data from an old storage system and sends the data to a client. Before and after the data migration, the client does not need to be changed, customer's storage costs are not increased, and this reduces skill requirements on a customer. Therefore, a problem that a customer's service is affected during data migration can be resolved.

The foregoing mainly describes the solutions provided in the embodiments of this disclosure from a perspective of interaction between each network element. It may be understood that to achieve the foregoing functions, each network element, such as the first storage system, includes a corresponding hardware structure and/or a software module for implementing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of this disclosure, function module division may be performed on the first storage system based on the foregoing method example. For example, each function module may be obtained by division based on a corresponding function, or two or more functions may be integrated in one processing module. The integrated module may be implemented in a form of hardware, or may be implemented in a form of a software functional module. It should be noted that, in this embodiment of this disclosure, module division is exemplary, and is merely a logical function division. In an actual implementation, another division manner may be used.

Figure 7:
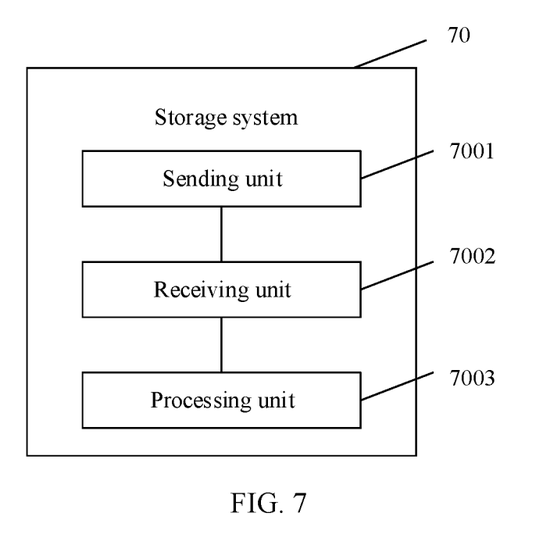
FIG. 7 is a schematic structural diagram of a first storage system according to an embodiment of this disclosure.

When each function module is obtained by division based on the corresponding function, FIG. 7 is a possible schematic structural diagram of the storage system involved in the foregoing embodiments. The storage system is used as the foregoing first storage system, and the storage system 70 includes a sending unit 7001, a receiving unit 7002, and a processing unit 7003. The processing unit 7003 is configured to support the first storage system 70 in performing the process 401 in FIG. 4, and the sending unit 7001 is configured to support the first storage system in performing the process 402 in FIG. 4. The receiving unit 7002 is configured to perform the processes 405 and 406 in FIG. 4. All related content of the steps in the foregoing method embodiment may be all cited in function descriptions of corresponding function modules. Details are not described herein again.

Figure 8:
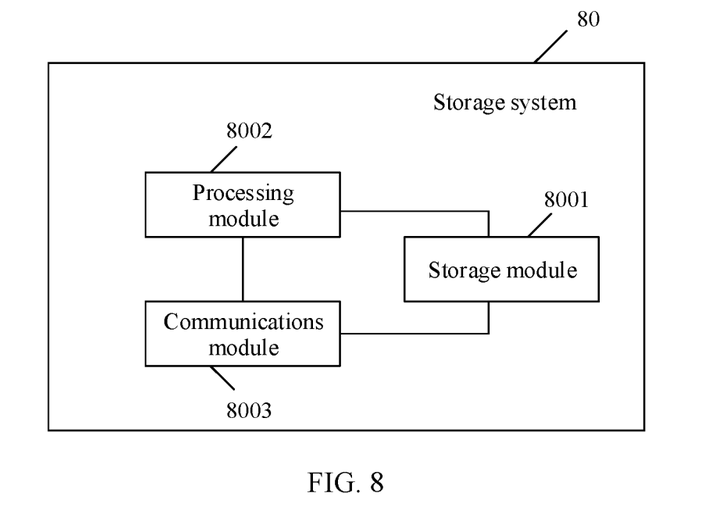
FIG. 8 is a schematic structural diagram of a first storage system according to an embodiment of this disclosure.

When an integrated unit is used, FIG. 8 is a possible schematic structural diagram of the storage system involved in the foregoing embodiments. The storage system is used as the foregoing first storage system. The storage system 80 includes a processing module 8002 and a communications module 8003. The processing module 8002 is configured to control and manage an action of the first storage system. The communications module 8003 is configured to send a location update request to a location server, where the location update request is used to indicate the location server to update location information of a first bucket from being located in a second storage system to being located in the first storage system. The communications module 8003 is further configured to migrate data in the first bucket from the second storage system, and store the data in a second bucket in the first storage system, where an identifier of the second bucket is the same as an identifier of the first bucket. The communications module 8003 is further configured to receive a data access request, where the data access request is used to access the data in the first bucket. The processing module 8002 is configured to determine, based on a type of the data access request and a migration status of the data, that the first storage system or the second storage system processes the data access request.

In this embodiment of this disclosure, optionally, the communications module 8003 may be configured to: first migrate metadata of an object in the first bucket, and then migrate remaining data other than the metadata in the first bucket.

In this embodiment of this disclosure, optionally, the communications module 8003 may be configured to: receive, from the second storage system, the data access request, or receive, from the first storage system, the data access request sent by a virtual host, where the data access request includes the identifier of the first bucket.

In this embodiment of this disclosure, optionally, the processing module 8002 may be configured to: when the type of the data access request is a download request, determine whether data requested by the download request has been migrated to the second bucket; when the data requested by the download request has been migrated to the second bucket, obtain, from the second bucket, the data requested by the download request; when the data requested by the download request has not been migrated to the second bucket, and the data requested by the download request is not the metadata, obtain, from the first bucket, the data requested by the download request, and send the data to a client; and when the data requested by the download request has not been migrated to the second bucket, and the data requested by the download request is the metadata, migrate the metadata from the first bucket to the second bucket for storage, and send the metadata to the client.

In this embodiment of this disclosure, optionally, the processing module 8002 may be configured to: when the type of the data access request is an upload request, store, in the second bucket, data uploaded by the upload request.

With reference to the method embodiment shown in FIG. 4, for example, the processing module 8002 is configured to support the first storage system in performing the processes 401 and 407 in FIG. 4, and/or is configured to perform another process of the technology described in this specification. The communications module 8003 is configured to support the first storage system in communicating with another network entity, for example, communicating with the function module or the network entity shown in FIG. 2. The communications module 8003 may be configured to support the first storage system in performing processes 402, 405, and 406 in FIG. 4. The first storage system may further include a storage module 8001 configured to store program code and data that are of the first storage system.

The processing module 8002 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logic blocks, modules, and circuits described with reference to content disclosed in this disclosure. Alternatively, the processor may be a combination implementing a computing function, for example, a combination including one or more microprocessors, or a combination of the DSP and the microprocessor. The communications module 8003 may be a transceiver, a transceiver circuit, a communications interface, or the like. The storage module 8001 may be a memory.

Figure 9:
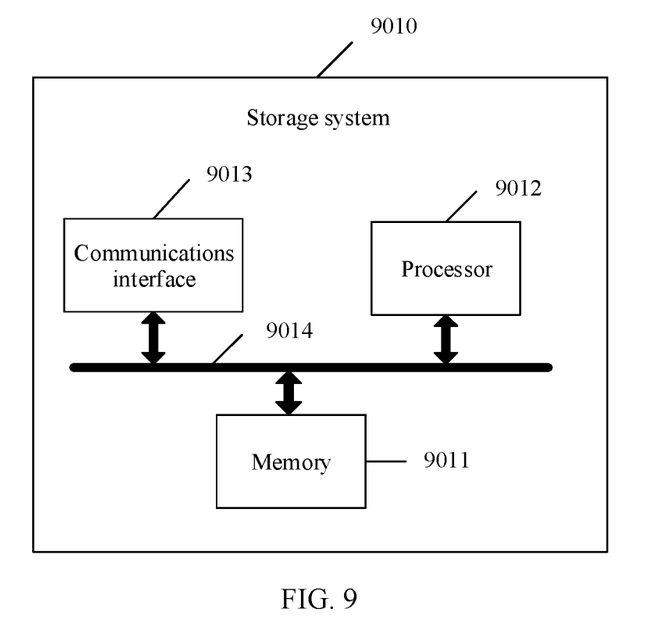
FIG. 9 is a schematic structural diagram of a first storage system according to an embodiment of this disclosure.

When the processing module 8002 is the processor, the communications module 8003 is the communications interface, and the storage module 8001 is the memory, the first storage system involved in this embodiment of this disclosure may be a storage system shown in FIG. 9.

Referring to FIG. 9, the storage system 9010 includes a processor 9012, a communications interface 9013, a memory 9011, and a bus 9014. The communications interface 9013, the processor 9012, and the memory 9011 are mutually connected by using the bus 9014. The bus 9014 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Method or algorithm steps described in combination with the content disclosed in this disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, the functions described in this disclosure may be implemented by hardware, software, firmware, or any combination thereof. When implemented by the software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A data migration method comprising:
   sending, by a first storage system, a location update request to a location server,
      wherein the location update request prompts the location server to update location information of a first bucket in a migrated second storage system from a location in the second storage system to a second bucket at a location in a first storage system, and
      wherein creation of the second bucket is based on metadata of the first bucket;
   migrating, by the first storage system, data in the first bucket from the second storage system, and storing the data in the second bucket in the first storage system;
   receiving, by the first storage system, a data download request used to access the data in the first bucket; and
   determining, by the first storage system and based on a type of the data requested by the data download request and a migration status of the data, which one of the first storage system or the second storage system processes the data download request, wherein the determination includes
      determining the type of the data requested by the data download request, wherein the type of the data is either metadata or not metadata,
      determining that the migration status of the data requested by the download request is that the migration of the data has started but is not yet completed,
      obtaining the requested data from the first bucket and sending the requested data to a client, based on determining that the type of the requested data is not metadata and the status of the migration is that the migration of the data has started but is not yet completed, and
      obtaining the requested data from the second bucket and sending the requested data to the client, based on determining that the type of the requested data is metadata and the status of the migration is that the migration of the data has started but is not yet completed.

2. The data migration method according to claim 1, wherein migrating the data in the first bucket from the second storage system comprises:
   first migrating, by the first storage system, the metadata of an object in the first bucket, and then migrating remaining data other than the metadata in the first bucket.

3. The data migration method according to claim 1, wherein receiving the data download request comprises:
   receiving, by the first storage system, the data access download from the second storage system, wherein the data download request comprises an identifier of the first bucket.

4. The data migration method according to claim 1, wherein receiving the data download request comprises:
   receiving, by the first storage system, the data download request sent by a virtual host, wherein the data download request comprises an identifier of the first bucket.

5. The data migration method according to claim 1, wherein obtaining the requested data from the second bucket and sending the requested data to the client, based on the type of the requested data being metadata and the status of the migration is the migration of the data has started but is not yet completed includes first sending the metadata to the client and then migrating data other than the metadata from the first bucket to the second bucket.

6. A first storage system comprising a processor and an interface, wherein the processor communicates with the interface, and the processor is configured to perform operations including:
   sending a location update request to a location server,
      wherein the location update request prompts the location server to update location information of a first bucket in a migrated second storage system from a location in the second storage system to a second bucket at a location in a first storage system, and
      wherein creation of the second bucket is based on metadata of the first bucket;
   migrating data in the first bucket from the second storage system, and storing the data in the second bucket in the first storage system;
   receiving a data access request used to download the data in the first bucket; and
   determining which one of the first storage system or the second storage system processes the data download request,
      wherein the determination is based on a type of the data requested by the data download request and a migration status of the data and includes
         determining the type of the data requested by the data download request, wherein the type of the data is either metadata or not metadata,
         obtaining the data from the second bucket and sending the data to the client, based on determining that the migration status of the data requested by the download request is that the migration to the second bucket is complete,
         obtaining the requested data from the first bucket and sending the requested data to a client, based on determining that the requested data is not metadata and the status of the migration is that the migration of the data has started but is not yet completed, and
         obtaining the requested data from the second bucket and sending the requested data to the client, based on determining that the type of the requested data is metadata and the status of the migration is that the migration of the data has started but is not yet completed.

7. The storage system according to claim 6, wherein the processor is further configured to perform operations including:
   first migrating the metadata of an object in the first bucket, and then migrating remaining data other than the metadata in the first bucket.

8. The storage system according to claim 6, wherein the processor is further configured to perform operations including:
   receiving the data download request from the second storage system, wherein the data download request comprises an identifier of the first bucket.

9. The storage system according to claim 6, wherein the processor is further configured to perform operations including:
   receiving the data download request sent by a virtual host, wherein the data download request comprises an identifier of the first bucket.

10. The storage system according to claim 6, wherein the processor operation of obtaining the requested data from the second bucket and sending the requested data to the client, based on the type of the requested data being metadata and the status of the migration is the migration of the data has started but is not yet completed includes:
   first sending the metadata to the client and then migrating data other than the metadata from the first bucket to the second bucket.

11. A non-transitory computer storage medium storing one or more computer instructions and, when the one or more computer instructions is executed by a computer, the computer is caused to perform operations including:
   sending a location update request to a location server,
      wherein the location update request prompts the location server to update location information of a first bucket in a migrated second storage system from a location in the second storage system to a second bucket located in the first storage system, and
      wherein creation of the second bucket is based on metadata of the first bucket;
   migrating data in the first bucket from the second storage system, and storing the data in the second bucket in the first storage system;
   receiving a data download request used to access the data in the first bucket; and
   determining which one of the first storage system or the second storage system processes the data download request,
      wherein the determination is based on a type of the data requested by the data download request and a migration status of the data and includes
         determining the type of the data requested by the data download request, wherein the type of the data is either metadata or not metadata,
         obtaining the data from the second bucket and sending the data to the client, based on determining that the migration status of the data requested by the download request is that the migration to the second bucket is complete,
         obtaining the requested data from the first bucket and sending the requested data to a client, based on determining that the requested data is not metadata and the status of the migration is that the migration of the data has started but is not yet completed, and
         obtaining the requested data from the second bucket and sending the requested data to the client, based on determining that the type of the requested data is metadata and the status of the migration is that the migration of the data has started but is not yet completed.

12. The non-transitory computer storage medium according to claim 11, wherein the operations further include:
   first migrating the metadata of an object in the first bucket, and then migrating remaining data other than the metadata in the first bucket.

13. The non-transitory computer storage medium according to claim 11, wherein the operations further include:
   receiving the data download request from the second storage system, wherein the data download request comprises an identifier of the first bucket.

14. The non-transitory computer storage medium according to claim 11, wherein the operations further include:
   receiving the data download request sent by a virtual host, wherein the data download request comprises an identifier of the first bucket.

15. The non-transitory computer storage medium according to claim 11, wherein the operation of obtaining the requested data from the second bucket and sending the requested data to the client based on the type of the requested data being metadata and the status of the migration is the migration of the data has started but is not yet completed includes:
   first sending the metadata to the client and then migrating data other than the metadata from the first bucket to the second bucket.

* * * * *